US010447398B1

(12) United States Patent
Al-Banna (10) Patent No.: US 10,447,398 B1
(45) Date of Patent: Oct. 15, 2019

(54) UPSTREAM SCHEDULING FOR OPTICAL NETWORKING UNIT (ONU)

(71) Applicant: ARRIS Enterprises LLC, Suwanee, GA (US)

(72) Inventor: Ayham Al-Banna, Orland Park, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/220,947

(22) Filed: Dec. 14, 2018

(51) Int. Cl.
| | | |
|---|---|---|
| H04B 10/2575 | (2013.01) |
| H04Q 11/00 | (2006.01) |
| H04L 12/28 | (2006.01) |
| H04B 14/00 | (2006.01) |
| H04L 5/00 | (2006.01) |

(52) U.S. Cl.
CPC ....... *H04B 10/2575* (2013.01); *H04B 14/004* (2013.01); *H04L 12/2801* (2013.01); *H04L 12/2898* (2013.01); *H04Q 11/0005* (2013.01); *H04Q 11/0067* (2013.01); *H04L 5/0007* (2013.01); *H04Q 2011/0015* (2013.01)

(58) Field of Classification Search
CPC .............. H04B 10/2575; H04B 14/004; H04L 12/2801; H04L 12/2898; H04L 5/0007; H04Q 11/0005; H04Q 11/0067; H04Q 2011/0015
See application file for complete search history.

(56) References Cited

U.S. PATENT DOCUMENTS

| | | | | |
|---|---|---|---|---|
| 6,980,519 B1 * | 12/2005 | Horn | ................... | H04L 12/5602 370/235 |
| 8,670,661 B2 * | 3/2014 | Haran | ................ | H04B 10/0793 398/17 |
| 2002/0196801 A1 * | 12/2002 | Haran | ................... | H04J 3/0655 370/432 |
| 2004/0109688 A1 * | 6/2004 | Kim | ................... | H04Q 11/0067 398/68 |
| 2005/0041682 A1 * | 2/2005 | Kramer | .............. | H04Q 11/0067 370/458 |
| 2005/0249497 A1 * | 11/2005 | Haran | ..................... | H04L 47/13 398/58 |
| 2007/0019957 A1 * | 1/2007 | Kim | ................... | H04Q 11/0067 398/72 |
| 2007/0041384 A1 * | 2/2007 | Das | .................... | H04Q 11/0067 370/395.4 |

(Continued)

*Primary Examiner* — Mina M Shalaby
(74) *Attorney, Agent, or Firm* — Lori Anne D. Swanson (57) ABSTRACT

In one embodiment, a method analyzes a size of a grant included in an upstream transmission from the device using a radio frequency over an optical network. When the size of the grant is less than a threshold, scheduling the upstream transmission on a first type of channel. The first type of channel includes characteristics of transmission such that an optical transmitter of an optical networking unit that receives the upstream transmission from the device will turn on when transmitting the upstream transmission via the optical network. When the size of the grant is greater than the threshold, scheduling the upstream transmission on a second type of channel. The size of the grant is such that the optical transmitter that receives the upstream transmission from the device is predicted to turn on when transmitting the upstream transmission via the optical network.

20 Claims, 5 Drawing Sheets

(56) References Cited

U.S. PATENT DOCUMENTS

| | | | |
|---|---|---|---|
| 2010/0215369 A1* | 8/2010 | Effenberger | H04J 3/1694 398/67 |
| 2012/0087664 A1* | 4/2012 | Zhang | H04J 14/0298 398/66 |
| 2014/0241723 A1* | 8/2014 | McGarry | H04L 49/357 398/67 |
| 2017/0265106 A1* | 9/2017 | Andreoli-Fang | H04W 28/0268 |
| 2017/0317779 A1* | 11/2017 | Wu | H04J 14/0232 |
| 2018/0316992 A1* | 11/2018 | Zheng | H04B 10/25 |

* cited by examiner

UPSTREAM SCHEDULING FOR OPTICAL NETWORKING UNIT (ONU)

BACKGROUND

Radio frequency over glass (RFoG) networks enable the delivery of data over cable service interface specification (DOCSIS) signals in fiber-to-the-home (FTTH) networks. This allows a multiple service operator (MSO) to offer optical transmission to at or near a subscriber's premises, but continue to use the radio frequency (RF) infrastructure inside the premises. One problem with the use of RFoG operations on DOCSIS networks is the limited dynamic range of an RFoG optical networking unit (ONU) device. The ONU terminates the optical connection from the head-end and converts the optical signals to radio frequency for transmission in the subscriber's premises. The ONU includes a limited dynamic range that may not satisfy the wide dynamic range of upstream orthogonal frequency division multiplexing access (OFDMA) signals, such as the DOCSIS 3.1 upstream OFDMA signals. For example, the DOCSIS 3.1 bursts over OFDMA channels from one customer premise equipment (CPE), such as a cable modem, can have a very small bandwidth, such as being as small as one mini-slot, to very large bandwidth (e.g., covering multiple channels of \ 200 MHz or more of spectrum). The wide dynamic range of the bursts may be problematic when mated with the limited dynamic range of the ONUs and lead to laser clipping in the case of stronger and larger bandwidth upstream OFDMA signal levels and also cause problems with the laser not even turning on when having to transmit lower strength and smaller bandwidth upstream OFDMA signal levels.

The limited dynamic range of upstream signals may be solved by running the ONU in a continuous (CW) mode, which keeps the laser always on. While the limited dynamic range of the ONU may be addressed by this solution, the power consumption of the ONU becomes inefficient by operating the ONU in the continuous mode, may also funnel upstream noise in the signal because the laser is always on, and may require ONU feature support, configuration, and management to implement the continuous mode.

DETAILED DESCRIPTION

Described herein are techniques for an optical transmission system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments use a schedule-based process to overcome the limited upstream dynamic range of an optical networking unit (ONU) device. The schedule-based process does not require any special support or configuration of the ONU device that was not already configured during normal operation (e.g., no continuous mode needs to be configured). Some embodiments configure one or more single-channel quadrature amplitude modulation (SC-QAM) channels in addition to one or more OFDMA channels in the upstream direction. Then, an upstream scheduler may schedule upstream transmissions on either the SC-QAM channels or the OFDMA channels. In some examples, the upstream scheduler schedules small bandwidth signals from subscriber CPE on the SC-QAM channels and larger bandwidth transmissions on the OFDMA channels. Scheduling the smaller bandwidth transmissions on the SC-QAM channels solves the above problem discussed in the Background about the limited dynamic range of the ONUs because an SC-QAM transmission may use enough bandwidth of the SC-QAM channel, which will turn on a laser on the ONU. However, if the OFDMA channel was used, a small bandwidth signal would only use a small portion of the OFDMA channel, which may not turn on the laser of the ONU.

The schedule-based process does not require the ONUs to be continuously running, such as in continuous CW mode, and therefore avoids unnecessary additional power consumption by the ONUs. The schedule-based process also prevents cumulative noise funneling that occurs when all ONUs are continuously running in CW mode. Finally, the schedule-based process does not require any special support or configuration for the ONU device to run in the continuous mode and makes the management of the ONU population easier and more cost-effective. Rather, the ONU remains in a burst mode where a laser is turned on to make a transmission from a subscriber CPE.

System Overview

Figure 1:
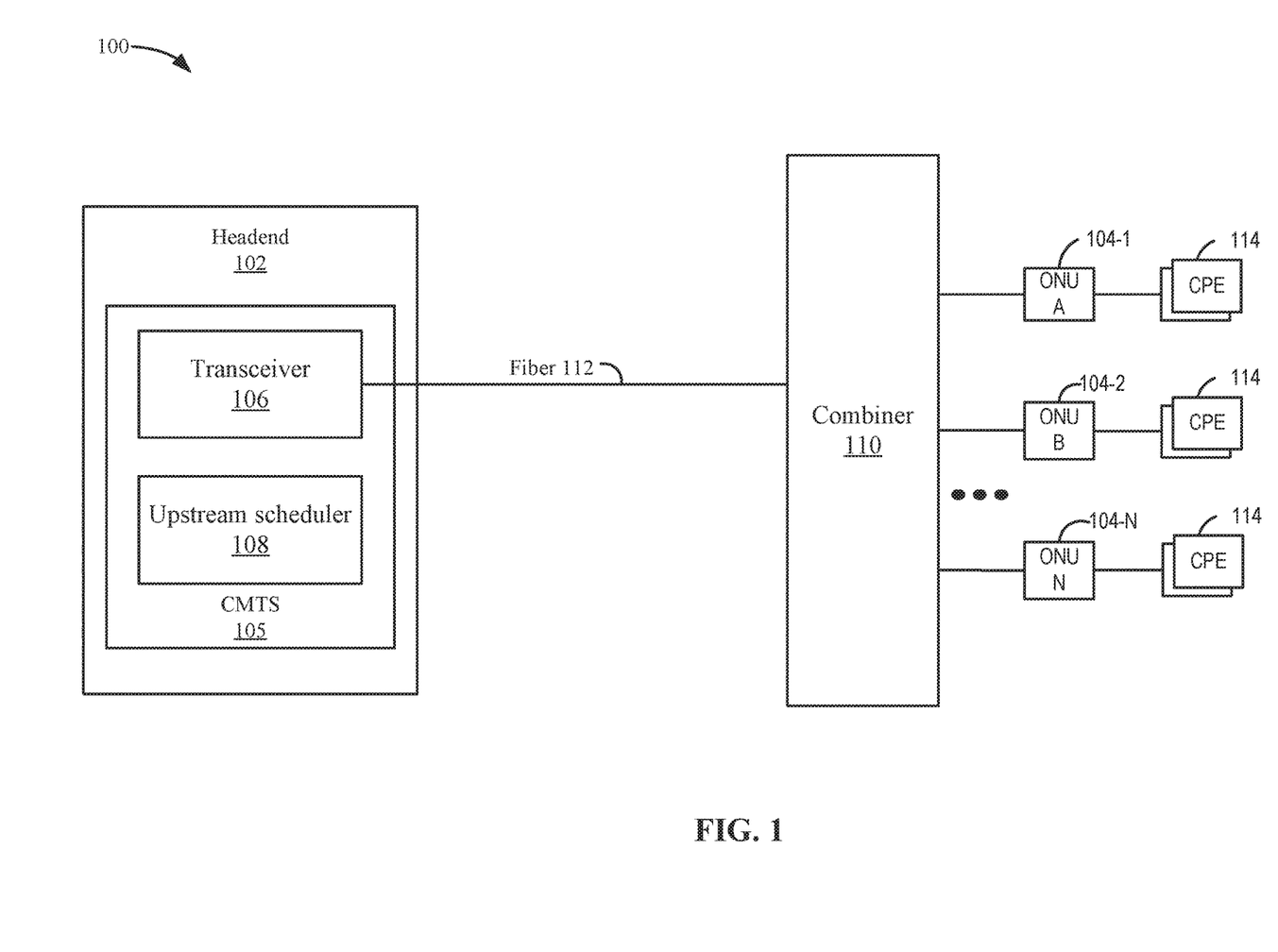
FIG. 1 depicts a simplified system for operating ONUs according to some embodiments.

FIG. 1 depicts a simplified system 100 for operating ONUs 104 according to some embodiments. System 100 includes a head-end 102, a fiber connection 112, a combiner 110, and ONUs A-N 104-1 to 104-N. Head-end 102 may send optical signals via fiber 112 to ONUs A-N 104-1 to 104-N in the downstream direction. ONUs 104 may then convert the optical signals to RF, and send the RF signals to CPE 114 in a subscriber's home, such as a cable modem. In the upstream direction, ONUs 104 may receive RF signals from the subscriber CPE, convert the signals to optical signals, and send the signals upstream to combiner 110. Combiner 110 combines the signals and sends the optical signal via fiber 112 to headend 102.

In some embodiments, system 100 implements an RFoG network, which is a fiber to the home (FTTH) technology that may operate concurrently with an HFC network, such as out of the same headend/hub in a cable network. RFoG permits the continued use of traditional HFC equipment and back-office applications with fiber-to-the-premise deployments. For example, RFOG enables cable operators to reuse existing headend equipment and infrastructure of Data Over Cable Service Interface Specification (DOCSIS) service delivery. Thus, use of existing cable modem termination system (CMTS) platforms, headend equipment, set-top boxes, and cable modems can continue while gaining benefits inherent with RFoG systems. For example, concurrent RFOG/HFC operation enables the use of RFoG for node splitting, which may increase capacity in an existing HFC network.

System 100 can include a cable modem termination system (CMTS) 105 located at a headend 102 of a multiple service operator (MSO), such as a cable company. As described in more detail below, CMTS 105 can be used to serve customers on a Hybrid Fiber-Coaxial (HFC) broadband network, an RFoG broadband network, or a mixed HFC and RFoG network. One or more subscriber CPE (e.g., cable modems, embedded media terminal adapters (EM-TAs—also known as cable telephony modems, or set-top boxes) can communicate with the CMTS 105.

CMTS 105 is typically provided at a headend 110 or hub site of a broadband network for providing high speed data services such as Internet, Voice over Internet Protocol, or digital video services to subscribers of a cable TV operator or to like customers. CMTS 105 hosts downstream and upstream ports and contains numerous transceivers, each transceiver handling communications between hundreds of end user devices (e.g., network elements) connected to the broadband network.

An RFoG topology includes an all-fiber service from the headend 110 to ONU 104, which is typically located at or near a subscriber's premises. In the headend 102, a downstream laser sends a broadcast signal that is optically split multiple times.

Optical networking units (ONUs) in the RFoG network terminate the fiber connection at a subscriber-side interface and convert traffic for delivery over the in-home network at the customer premises. The optical network unit, or ONU, recovers the RF broadcast signal from the optical signal, and passes it into the subscriber's coax network. Coaxial cable can be used to connect the ONUs of the RFoG network to one or more subscriber CPE. For example, the ONU may connect to set-top boxes, cable modems, or similar network elements via coaxial cable, and one or more of the cable modems may connect to the subscriber's internal telephone wiring and/or to personal computers or like devices via Ethernet or Wi-Fi connections.

CMTS 105 can include one or more transceivers 106 for transmitting signals to and receiving signals from one or more subscriber CPE. Transceivers 106 can be one or more separate transmitter and receiver components residing on the same board, or separate boards; further, the transmitter and receiver can also include various sub-components, such as modulators and demodulators.

The upstream path for voice, data, video from subscriber CPE is through ONU 104, which converts the upstream signal to an optical upstream signal and transmits the optical upstream signal to transmitter/receiver 106 at headend 102 or hub. Upstream transmissions from the subscriber CPE can pass through fiber 112 and be received by transmitter/receiver 106 at headend 102. Transmitter/receiver 106 receives the optically modulated signals on optical channels and demodulates the signals into the electrical signals, which may be RF signals.

Also, ONUs convert optical signals from headend 110 into electrical signals at the subscriber's premises and thereby terminate the RFoG system at the subscriber-side interface. This is accomplished in place of the same function traditionally performed back at the higher-level serving area optical nodes in the HFC network. The RF infrastructure remains in place; the difference is that the optic fiber termination is moved from an optical fiber node of the HFC network to an ONU at or nearby the customer premises. By way of example, the ONU can be located at a single home, a business, a multi-tenant dwelling (MTU/MDU) or an individual living unit within an MTU.

RFoG networks may use SC-QAM channels and OFDMA channels. These channels include different characteristics that will be described below. Although the RFoG network is described, other optical networks that allow both SC-QAM channels and OFDMA channels may be used.

In headend 102, an upstream scheduler 108 may schedule the signals sent by ONUs 104. In some embodiments, as will be described in more detail below, upstream scheduler 108 may schedule transmission of signals from ONUs 104 on different types of channels. For example, upstream scheduler 108 schedules a first type of signals on SC-QAM channels and a second type of signals on OFDMA channels. In some embodiments, the first type of signals may be signals that are considered to use a small amount of bandwidth. These small bandwidth signals may not use enough bandwidth to turn on an optical source, such as a laser, of ONU 104 when using OFDMA channels to transmit the signal upstream (e.g., when not using continuous mode). However, when the small bandwidth signals are transmitted on an SC-QAM channel, the characteristics of sending signals on SC-QAM channels turns on the laser. For example, signals sent via the SC-QAM channel have a preamble as well as a minimum bandwidth that is used, which together typically are enough to turn on a laser. The preamble is a defined data burst of a fixed duration each modem transmits before starting to send real data of the transmission. Using the preamble may ensure that the laser is turned on no matter how much real data is sent in the transmission The second type of transmission may be considered larger bandwidth transmissions and are sent on the OFDMA channels. The larger bandwidth transmissions typically use enough bandwidth to turn on a laser when using OFDMA channels.

Channel Configuration

Figure 2:
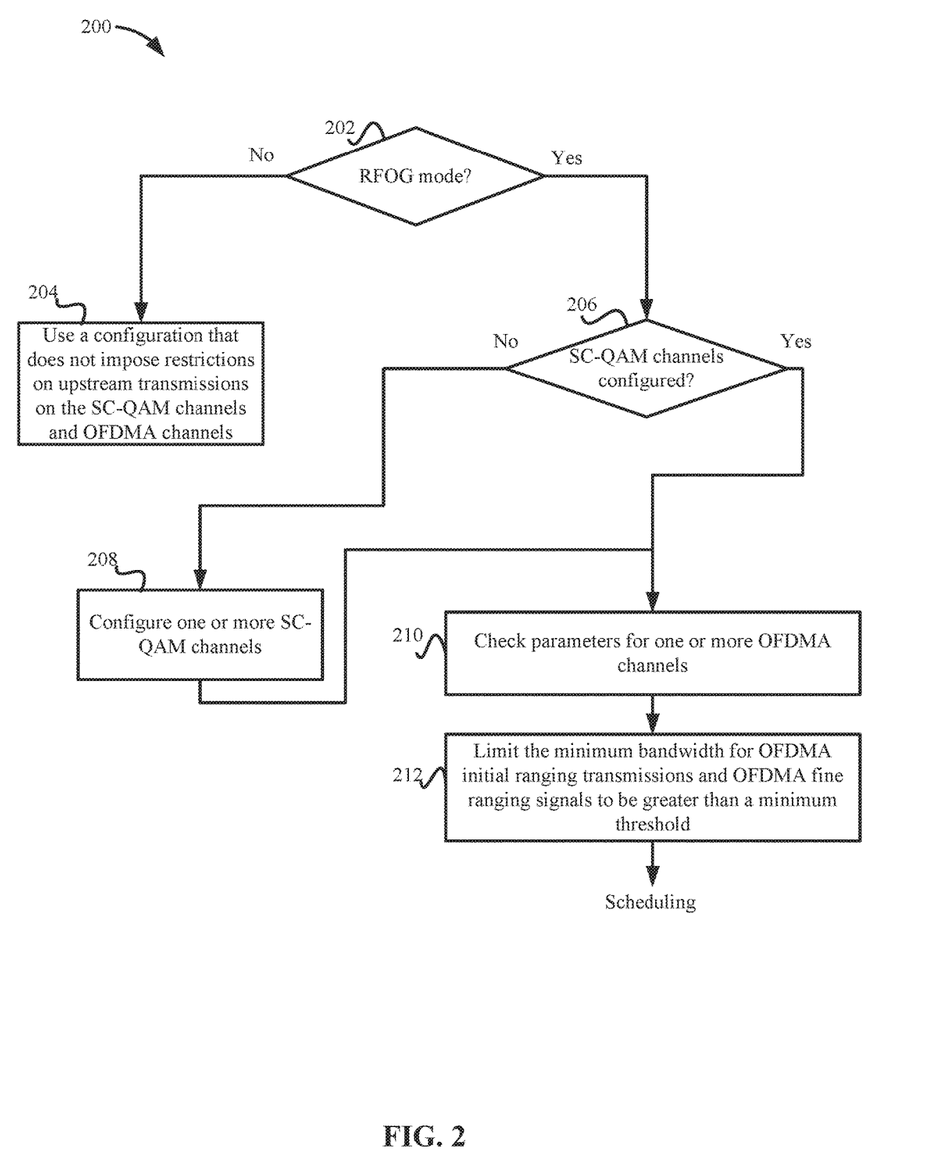
FIG. 2 depicts a simplified flowchart of a method for performing the configuration of channels according to some embodiments.

CMTS 105 may configure channels for ONU 104 and subscriber CPE to transmit upstream. FIG. 2 depicts a simplified flowchart 200 of a method for performing the configuration of channels according to some embodiments. At 202, CMTS 105 determines if it is operating in an RFoG mode. The RFoG mode is a mode to be configured on the CMTS to run upstream scheduler 108 in a mode that requires mixed configurations of SC-QAM channels and OFDMA channels. The RFoG mode also imposes certain requirements for configuration of the channels and requirements on the types of upstream transmissions that are transmitted on the SC-QAM channels and OFDMA channels as will be discussed below.

At 204, if CMTS 105 determines that it is not operating in RFoG mode, then CMTS 105 uses a configuration that does not impose restrictions on upstream transmissions on the SC-QAM channels and OFDMA channels.

If CMTS 105 is operating in RFoG mode, then at 206 CMTS 105 checks the CMTS configuration to determine if SC-QAM channels are configured. If not, at 208, CMTS 105 configures one or more SC-QAM channels for ONU 104.

After the configuration in 208, at 210, CMTS 105 checks parameters for one or more OFDMA channels. For example, parameters for ranging signals may be checked, but also other parameters for restrictions that are imposed on other types upstream transmissions in the RFoG may be checked.

At 212, CMTS 105 limits the minimum bandwidth for OFDMA initial ranging transmissions and OFDMA fine ranging signals to be greater than a minimum threshold. The minimum threshold may be a spectrum or bandwidth that is predicted to be enough to turn on a laser of the ONUs. The initial ranging signals and fine ranging signals may be used to determine distances between ONUs and the headend. The initial ranging and fine ranging signals may introduce issues when scheduled on OFDMA channels because of the size of the signals. For the initial ranging signals, CMTS 105 may only allow the configuration of initial ranging signals that are larger than a pre-set minimum bandwidth. That is, the initial ranging signals must possess a wide enough spectrum (e.g., mini-slots) that are enough to turn the laser on. In some examples, the initial ranging signals may have a bandwidth that is as narrow as one mini-slot, but larger bandwidth signals may be allowed. In some examples, it is possible that the configuration for initial ranging signals may be about five mini-slots (e.g., around 2 MHz) of spectrum. If configured around five mini-slots, then this bandwidth may be enough to turn the laser on.

For fine ranging signals, two options may be possible, a narrow-band fine ranging signal and a wideband probe-based fine ranging signal. CMTS 105 can use the probe-based fine ranging method because the probe-based fine ranging method uses enough bandwidth in the OFDMA channel to turn the laser on. CMTS 105 could also use the narrow-band signal method provided that the narrow-band fine ranging signal has a bandwidth that is larger than a certain threshold. For example, CMTS 105 may configure the narrow-band fine ranging signal bandwidth to be at least 6.4 MHz wide or around seven mini-slots, but this is just an example of configuring the bandwidth to be larger than a threshold to turn on a laser of ONU 104. CMTS 105 may also use a combination of the probe-based fine ranging method and the narrow-band fine ranging signal method.

Scheduling

Figure 3:
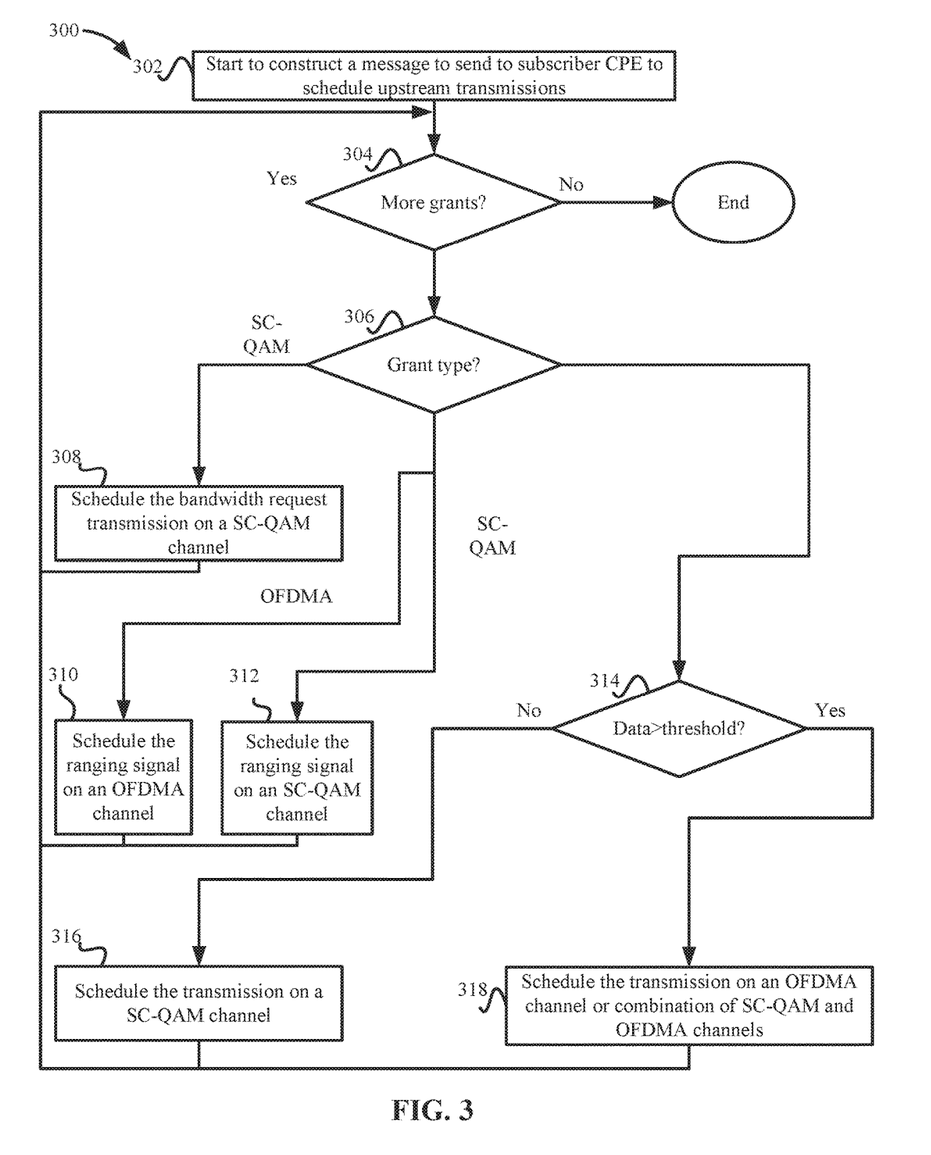
FIG. 3 depicts a simplified flowchart of a method for scheduling upstream communications according to some embodiments.

After the configuration, CMTS 105 proceeds to scheduling. FIG. 3 depicts a simplified flowchart 300 of a method for scheduling upstream communications according to some embodiments. At 302, upstream scheduler 108 starts to construct a message to send to subscriber CPE to schedule upstream transmissions. Upstream scheduler 108 tries to map/schedule different bursts for different subscriber CPE 114 into a future time interval. The description of that future time interval is called the map message that is sent down to subscriber CPE 114 so that each subscriber CPE 114 knows what and when to transmit (so subscriber CPE 114 do not transmit on top of each other). Upstream scheduler 108 schedules different upstream transmission types to fill that future time interval.

At 304, upstream scheduler 108 determines if there are more grants to schedule in the time period. If not the process ends. A grant is a scheduled upstream transmission to a subscriber CPE.

At 306, upstream scheduler 108 determines the type of grant. As discussed above, different types of upstream transmissions may be scheduled. Some transmissions may be types that are always sent on SC-QAM channels. In some examples, an SC-QAM-specific transmission may be bandwidth requests, which may be requests from a modem for bandwidth. The bandwidth requests may use a small amount of bandwidth and scheduling the bandwidth requests on SC-QAM channels will always turn a laser on. However, sending bandwidth requests on OFDMA channels may not turn the laser on due to the small amount of data included in the bandwidth requests. Accordingly, if the transmission will be an SC-QAM-specific transmission, at 308, upstream scheduler 108 schedules the transmission on an SC-QAM channel.

Also, upstream scheduler 108 determines if the transmission will be a ranging signal. Some OFDMA transmissions may include fine ranging signals and initial ranging signals. At 310, upstream scheduler 108 schedules the ranging signal on an OFDMA channel \. For example, probe-based fine ranging signals or narrow-band fine ranging signals may have been configured previously with certain limits as described in FIG. 2 and can be scheduled on an OFDMA channel. Further, at 312, upstream scheduler 108 may schedule the ranging signals on SC-QAM channels, which do not need any prior configuration to send the ranging signals upstream. Also, other than a ranging signal, upstream scheduler 108 may test for other specific types of upstream transmissions that have been specially configured for a type of channel.

Upstream scheduler 108 determines if the transmission is a data grant or other type of transmission that does not fall within a bandwidth request or ranging signal. If so, at 314, upstream scheduler 108 determines if the grant includes data that is bigger than a threshold. In some embodiments, the threshold may be set such that if the data is above the threshold, the upstream transmission is predicted to use enough bandwidth in an OFDMA channel to turn on the laser. If the data is bigger than the threshold, at 316, upstream scheduler 108 schedules the transmission of the data for an OFDMA channel. Alternatively, upstream scheduler 108 may schedule the data to be transmitted on both an OFDMA channel and an SC-QAM channel provided that the amount of data scheduled on the OFDMA channel is larger than the threshold such that the laser will turn on. If the data is not bigger than a threshold, at 318, upstream scheduler 108 schedules the data on an SC-QAM channel.

Then, the message is modulated and encoded, and sent to subscriber CPE to schedule the upstream transmissions. The message may include scheduling instructions for multiple subscriber CPE, such as the time of a transmission and which channel to transmit on. Then, upstream scheduler 108 sends the message to ONUs 104. Accordingly, upstream scheduler 108 schedules the transmission from subscriber CPE on either the SC-QAM channel or the OFDMA channel based on characteristics of the transmission. However, the scheduling is performed such that when transmitted through an OFDMA channel at an ONU, the transmission will include enough data to always turn the laser on.

ONU/Subscriber CPE

Figure 4:
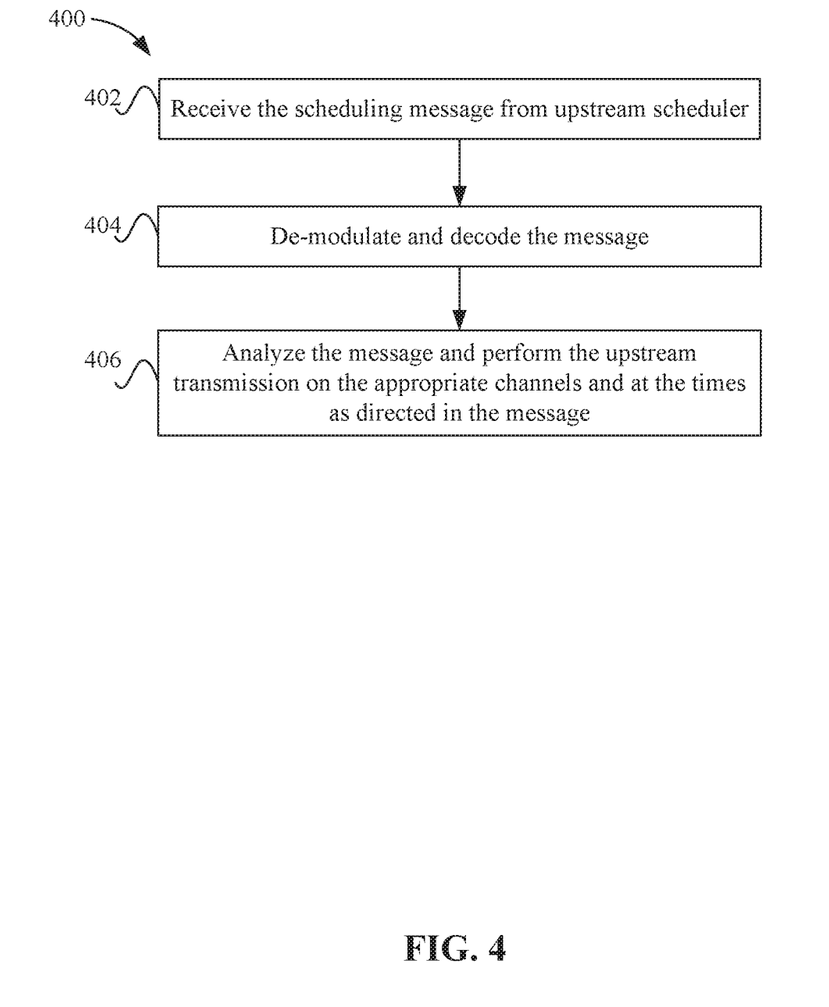
FIG. 4 depicts a simplified flowchart of a method for transmitting upstream according to some embodiments.

Subscriber CPE devices that are connected to ONUs 104 may transmit upstream based on the scheduling by upstream scheduler 108. FIG. 4 depicts a simplified flowchart 400 of a method for transmitting upstream according to some embodiments. The transmission may originate at a subscriber CPE connected to ONU 104.

At 402, the subscriber CPE receives the scheduling message from upstream scheduler 108. In some embodiments, upstream scheduler 108 may send a message called a map message that is broadcast to all subscriber CPE. The message tells each modem to transmit on which type of channel and when to send the transmission. In some embodiments, the same message is broadcast to each subscriber CPE. Once receiving the message, at 404, the subscriber CPE demodulates and decodes the message.

Then, at 406, the subscriber CPE analyzes the message and performs the upstream transmission on the appropriate channels and at the times as directed in the message. For example, the initial ranging signals and fine ranging signals are sent on configured OFDMA channels or SC-QAM channels. Additionally, subscriber CPE send bandwidth requests and messages that include data smaller than a threshold on SC-QAM channels while sending messages that include data above the threshold on OFDMA channels and/or SC-QAM channels provided enough data is sent on the OFDMA channel. To transmit the signals upstream, a transmitter in subscriber CPE may use an SC-QAM channel modulator to send data using the SC-QAM channel or an OFDMA channel modulator to send data on an OFDMA channel. The data for both channels may be generated and combined and then get transmitted via a single transmitter. ONU 104 receives the transmissions from the modem and can convert the RF signals to optical signals. The signals included in the upstream transmissions are configured to always turn on a laser of ONU 104.

Conclusion

Accordingly, some embodiments provide a schedule-based process that can overcome the limited upstream dynamic range issue without continuously turning on a laser of the ONU. The scheduling process selectively schedules transmissions on SC-QAM channels and OFDMA channels based on the characteristics of the transmission. By selectively scheduling the transmissions on the SC-QAM channels and the OFDMA channels, the schedule-based process may guarantee that a laser of an ONU turns on.

System

Figure 5:
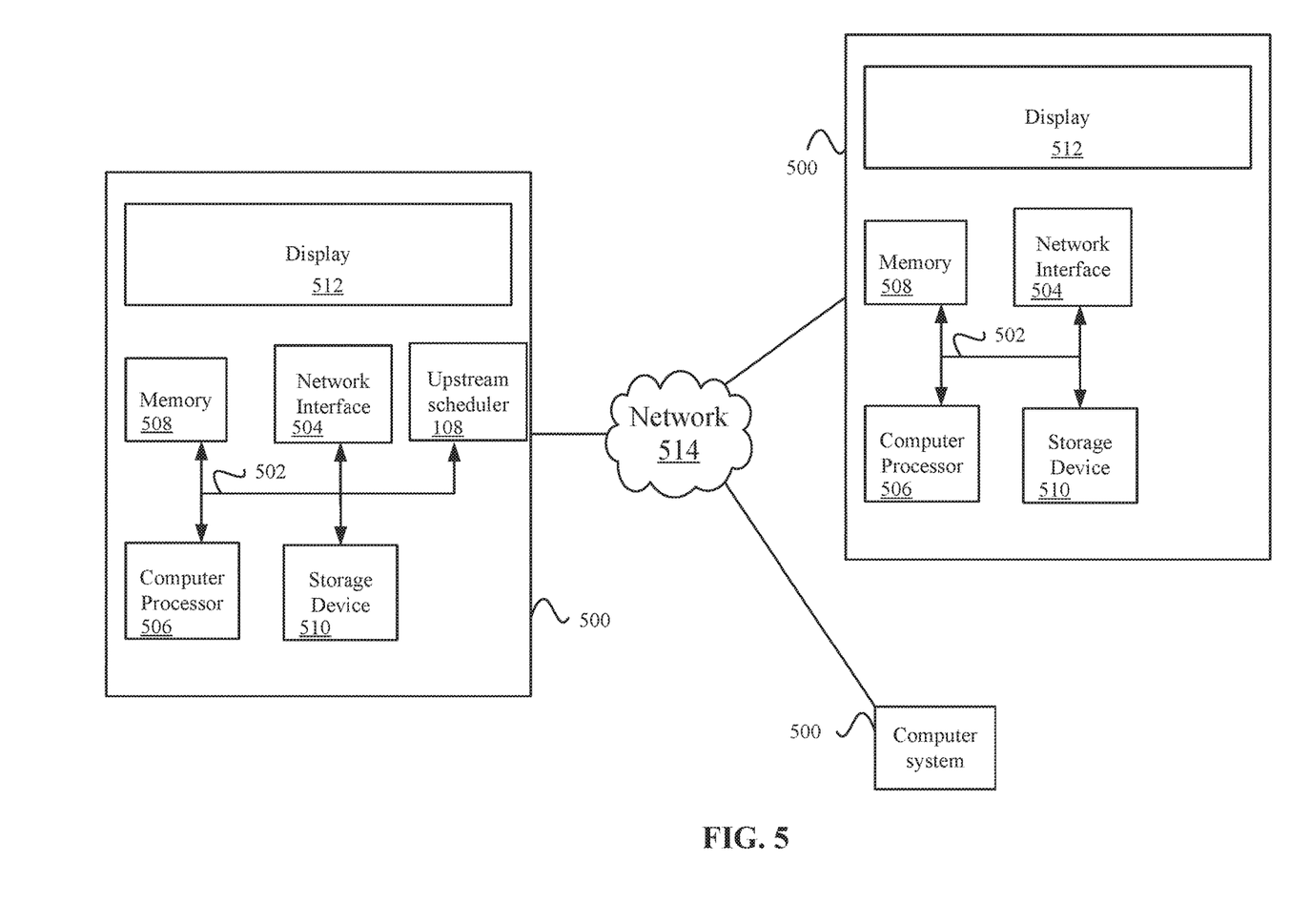
FIG. 5 illustrates an example of special purpose computer systems configured with an upstream scheduler according to one embodiment.

FIG. 5 illustrates an example of special purpose computer systems 500 configured with an upstream scheduler 108 according to one embodiment. Computer system 500 includes a bus 502, network interface 504, a computer processor 506, a memory 508, a storage device 510, and a display 512.

Bus 502 may be a communication mechanism for communicating information. Computer processor 506 may execute computer programs stored in memory 508 or storage device 508. Any suitable programming language can be used to implement the routines of some embodiments including C, C++, Java, assembly language, etc. Different programming techniques can be employed such as procedural or object oriented. The routines can execute on a single computer system 500 or multiple computer systems 500. Further, multiple computer processors 506 may be used.

Memory 508 may store instructions, such as source code or binary code, for performing the techniques described above. Memory 508 may also be used for storing variables or other intermediate information during execution of instructions to be executed by processor 506. Examples of memory 508 include random access memory (RAM), read only memory (ROM), or both.

Storage device 510 may also store instructions, such as source code or binary code, for performing the techniques described above. Storage device 510 may additionally store data used and manipulated by computer processor 506. For example, storage device 510 may be a database that is accessed by computer system 500. Other examples of storage device 510 include random access memory (RAM), read only memory (ROM), a hard drive, a magnetic disk, an optical disk, a CD-ROM, a DVD, a flash memory, a USB memory card, or any other medium from which a computer can read.

Memory 508 or storage device 510 may be an example of a non-transitory computer-readable storage medium for use by or in connection with computer system 500. The non-transitory computer-readable storage medium contains instructions for controlling a computer system 500 to be configured to perform functions described by some embodiments. The instructions, when executed by one or more computer processors 506, may be configured to perform that which is described in some embodiments.

Computer system 500 includes a display 512 for displaying information to a computer user. Display 512 may display a user interface used by a user to interact with computer system 500.

Computer system 500 also includes a network interface 504 to provide data communication connection over a network, such as a local area network (LAN) or wide area network (WAN). Wireless networks may also be used. In any such implementation, network interface 504 sends and receives electrical, electromagnetic, or optical signals that carry digital data streams representing various types of information.

Computer system 500 can send and receive information through network interface 504 across a network 514, which may be an Intranet or the Internet. Computer system 500 may interact with other computer systems 500 through network 514. In some examples, client-server communications occur through network 514. Also, implementations of some embodiments may be distributed across computer systems 500 through network 514.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   configuring, by a computing device, a first type of channel and a second type of channel for upstream transmissions from a network device;
   analyzing, by the computing device, a size of an upstream grant for an upstream transmission from the network device, the upstream transmission using a radio frequency over an optical network;
   when the size of the upstream grant is less than a threshold, scheduling, by the computing device, the upstream transmission on the first type of channel, wherein the first type of channel includes characteristics of transmission such that an optical transmitter of an optical networking unit that receives the upstream transmission from the network device will turn on when transmitting the upstream transmission via the optical network; and
   when the size of the grant is greater than the threshold, scheduling, by the computing device, the upstream transmission on the second type of channel, wherein the threshold is set such that the optical transmitter of the optical networking unit that receives the upstream transmission from the network device is predicted to turn on when transmitting the upstream transmission via the optical network.

2. The method of claim 1, further comprising:
determining whether the first type of channel and the second type of channel are appropriate for upstream transmission.

3. The method of claim 2, wherein determining whether the first type of channel and the second type of channel are appropriate for upstream transmission comprises:
determining whether a scheduler performing the scheduling is operating in a Radio Frequency over Glass (RFoG) mode that requires mixed configurations of the first type of channel and the second type of channel.

4. The method of claim 1, wherein:
the first type of channel comprises a single carrier quadrature amplitude modulation (SC-QAM) channel, and
the second type of channel comprises an orthogonal frequency-division multiple access (OFDMA) channel.

5. The method of claim 1, further comprising:
analyzing the grant to determine whether the upstream transmission is a type of transmission that is specific to the first type of channel; and
when the upstream transmission is the type of transmission that is specific to the first type of channel, scheduling the upstream transmission on the first type of channel.

6. The method of claim 5, wherein the type of transmission that is specific to the first type of channel comprises a bandwidth request from the network device.

7. The method of claim 1, further comprising:
analyzing the grant to determine whether the upstream transmission is a type of transmission that is a signal that requires a configuration of the second type of channel; and
when the upstream transmission is the type of transmission that requires the configuration of a parameter of the second type of channel, scheduling the upstream transmission on the second type of channel to meet the parameter.

8. The method of claim 7, wherein the signal comprises a ranging signal.

9. The method of claim 8, wherein:
the ranging signal comprises an initial ranging signal, and the initial ranging signal is configured with a minimum amount of spectrum.

10. The method of claim 8, wherein:
the ranging signal comprises a fine ranging signal, and the fine ranging signal is configured as a narrow band fine ranging signal with a minimum amount of spectrum or as a probe based fine ranging signal.

11. The method of claim 1, wherein configuring the first type of channel and the second type of channel comprises:
determining whether the first type of channel has already been configured for the network device; and
if the first type of channel is not already configured, configuring the first type of channel for upstream transmission for the network device.

12. The method of claim 1, wherein configuring the second type of channel comprises:
determining whether a parameter for the second type of channel have already been configured for the network device; and
if not already configured, configuring the parameter for the second type of channel for upstream transmission for the network device to limit a minimum size of grant for the upstream transmission to be sent on the second type of channel.

13. The method of claim 1, further comprising:
sending a message to schedule the upstream transmission on the first type of channel or the second type of channel to the network device.

14. The method of claim 13, wherein the network device receives the message and transmits the upstream transmission on the scheduled first type of channel or the second type of channel.

15. The method of claim 1, wherein when the size of the grant is less than the threshold, the optical transmitter on the optical networking unit will not turn on when transmitting the upstream transmission on the second type of channel.

16. The method of claim 1, wherein the characteristics of transmission for the first type of channel will turn on the optical transmitter when transmitting the upstream transmission via the optical network for upstream transmissions below the size of the grant.

17. A non-transitory computer-readable storage medium containing instructions that, when executed, control a computer system to be configured for:
configuring a first type of channel and a second type of channel for upstream transmissions from a network device;
analyzing a size of an upstream grant for an upstream transmission from the network device, the upstream transmission using a radio frequency over an optical network;
when the size of the upstream grant is less than a threshold, scheduling the upstream transmission on the first type of channel, wherein the first type of channel includes characteristics of transmission such that an optical transmitter of an optical networking unit that receives the upstream transmission from the network device will turn on when transmitting the upstream transmission via the optical network; and
when the size of the grant is greater than the threshold, scheduling the upstream transmission on the second type of channel, wherein the threshold is set such that the optical transmitter of the optical networking unit that receives the upstream transmission from the network device is predicted to turn on when transmitting the upstream transmission via the optical network.

18. The non-transitory computer-readable storage medium of claim 17, wherein:
the first type of channel comprises a single carrier quadrature amplitude modulation (SC-QAM) channel, and
the second type of channel comprises an orthogonal frequency-division multiple access (OFDMA) channel.

19. The non-transitory computer-readable storage medium of claim 17, wherein the characteristics of transmission for the first type of channel will turn on the optical transmitter when transmitting the upstream transmission via the optical network for upstream transmissions below the size of the grant.

20. An apparatus comprising:
one or more computer processors; and
a non-transitory computer-readable storage medium comprising instructions, that when executed, control the one or more computer processors to be configured for:
configuring a first type of channel and a second type of channel for upstream transmissions from a network device;

analyzing a size of an upstream grant for an upstream transmission from the network device, the upstream transmission using a radio frequency over an optical network;

when the size of the upstream grant is less than a threshold, scheduling the upstream transmission on the first type of channel, wherein the first type of channel includes characteristics of transmission such that an optical transmitter of an optical networking unit that receives the upstream transmission from the network device will turn on when transmitting the upstream transmission via the optical network; and when the size of the grant is greater than the threshold, scheduling the upstream transmission on the second type of channel, wherein the threshold is set such that the optical transmitter of the optical networking unit that receives the upstream transmission from the network device is predicted to turn on when transmitting the upstream transmission via the optical network.

* * * * *